July 17, 1956 E. N. BRODEN 2,754,566
DRILLING AND ASSEMBLING MACHINE
Filed Sept. 26, 1950 4 Sheets-Sheet 1
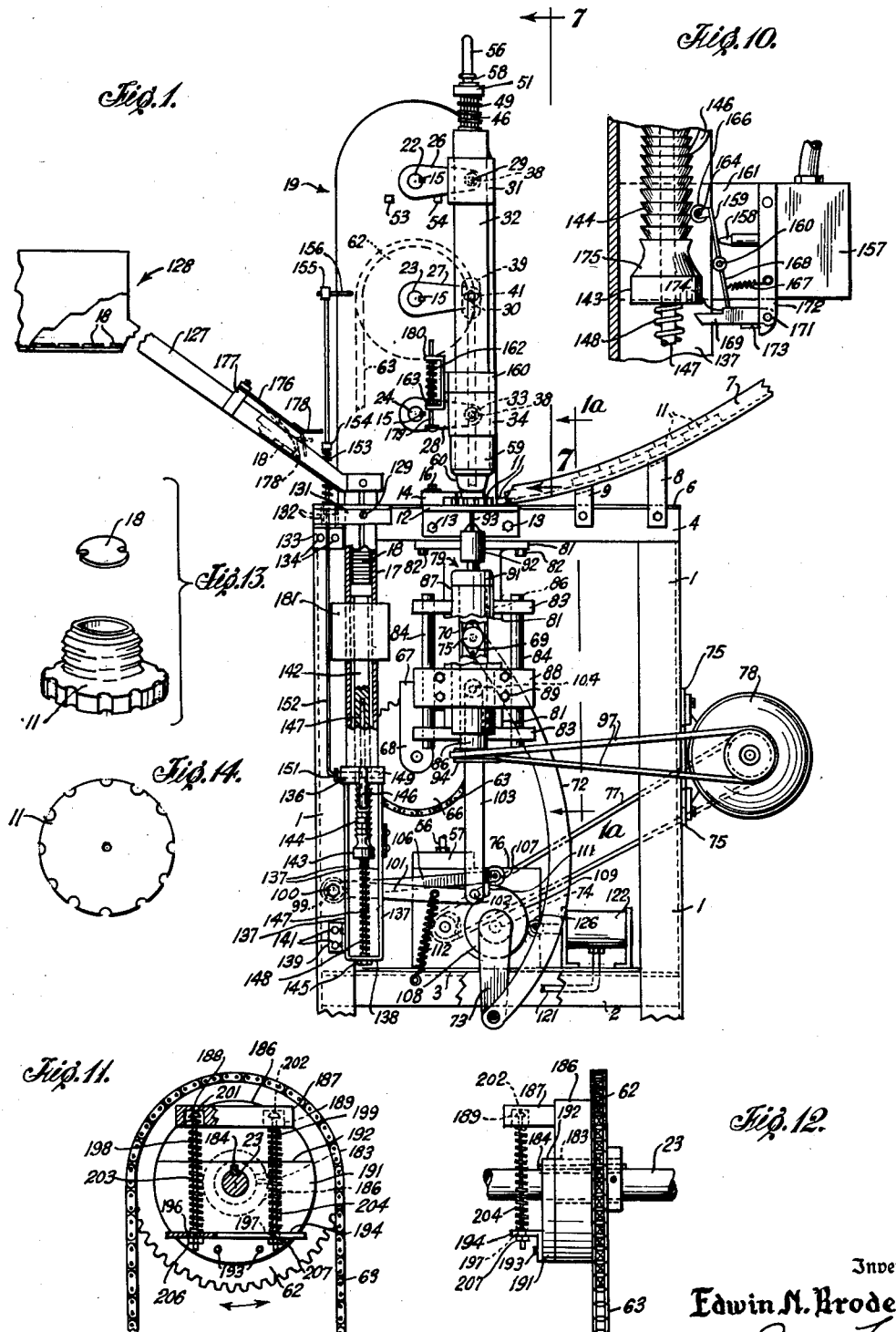
Inventor
Edwin N. Broden
Ely & Frye
Attorneys July 17, 1956 E. N. BRODEN 2,754,566
DRILLING AND ASSEMBLING MACHINE
Filed Sept. 26, 1950 4 Sheets-Sheet 2

INVENTOR.
Edwin N. Broden
BY
ATTORNEYS

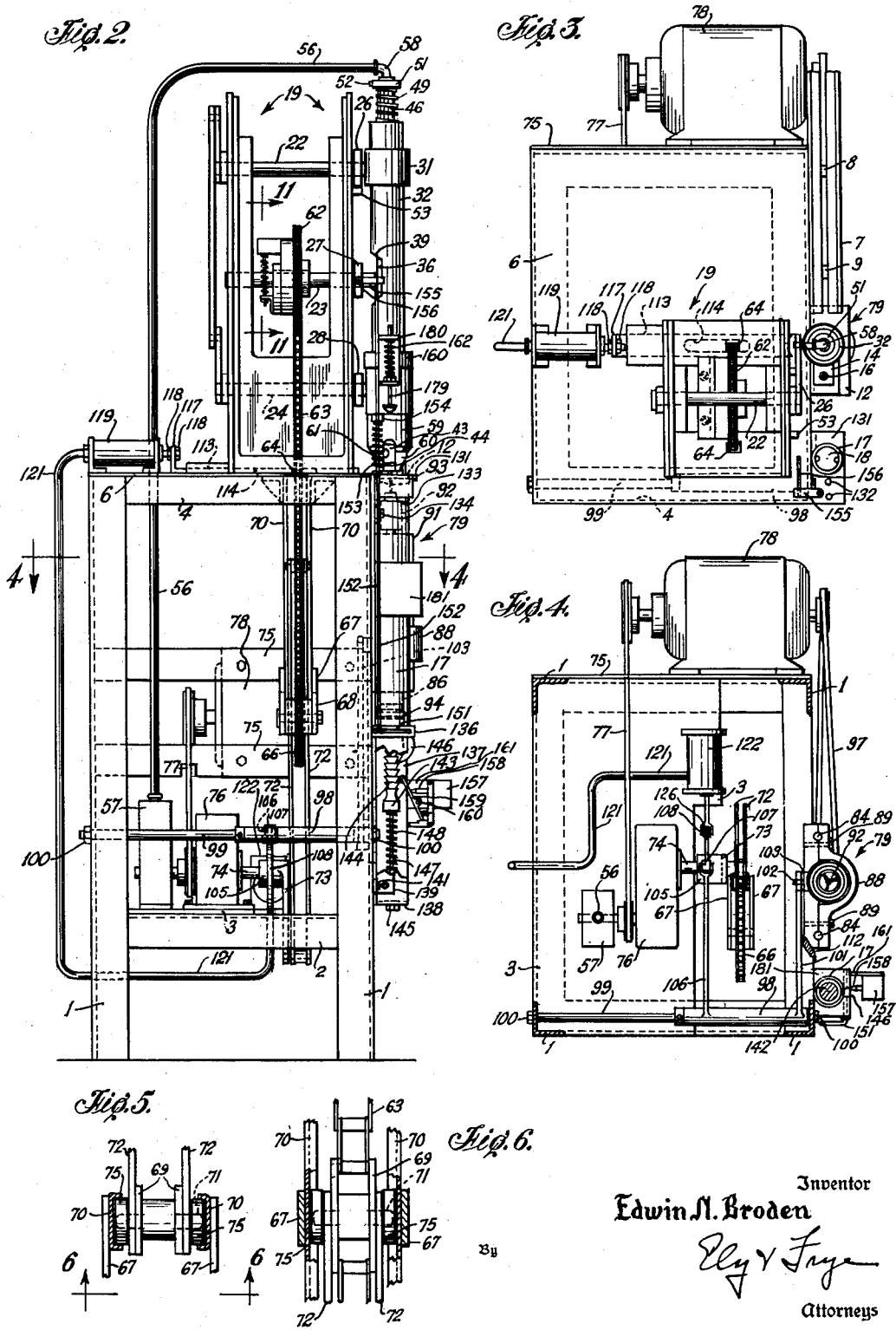

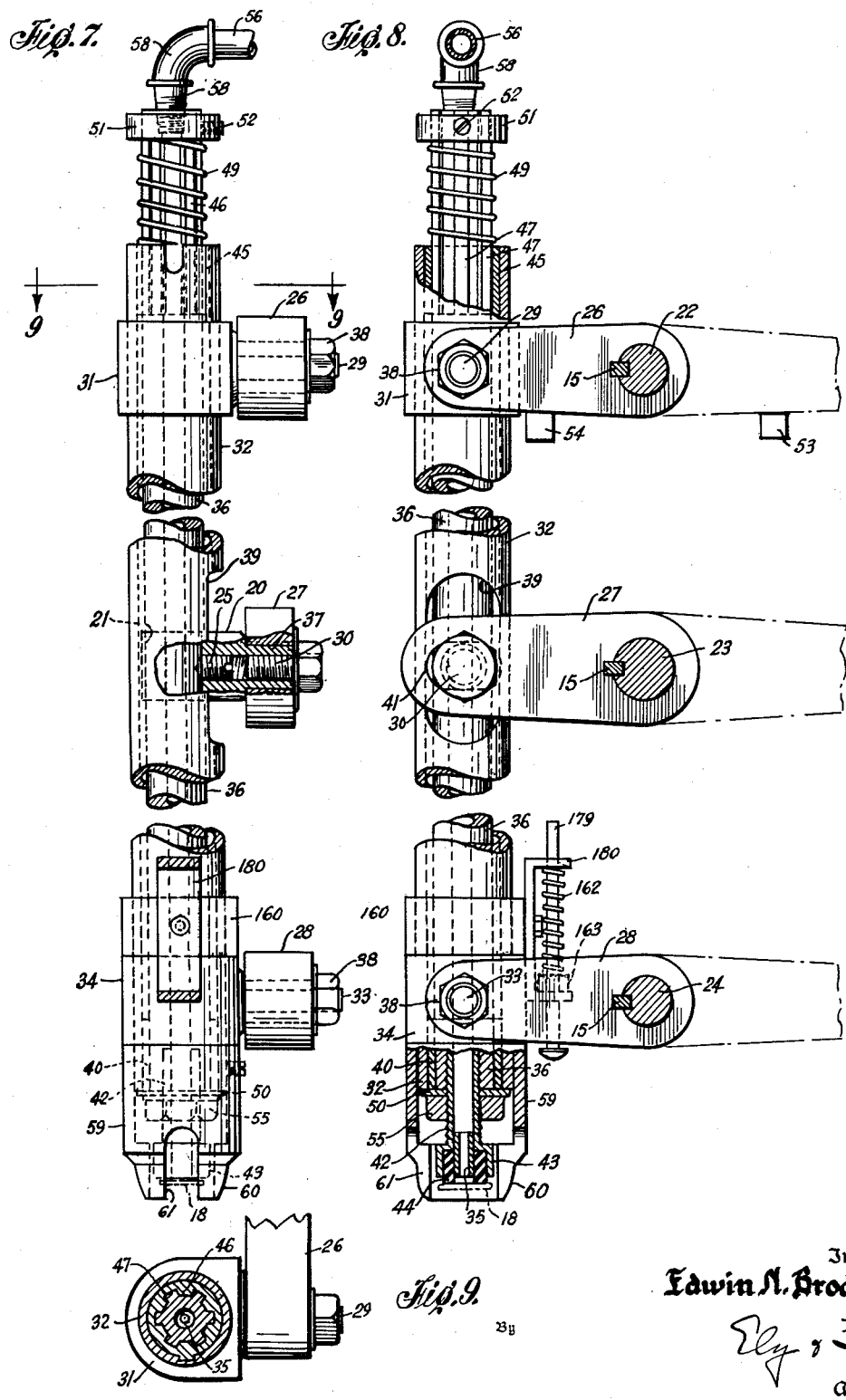

United States Patent Office 2,754,566
Patented July 17, 1956

2,754,566

DRILLING AND ASSEMBLING MACHINE

Edwin N. Broden, Assonet, Mass., assignor to The Firestone Tire & Rubber Company, Akron, Ohio, a corporation of Ohio Application September 26, 1950, Serial No. 186,807

15 Claims. (Cl. 29—33)

This invention relates to a machine for continuously and automatically picking up baffle discs and inserting them into battery caps, and concurrently drilling a vent hole in the cap. Heretofore, these operations have been performed separately, in operations requiring considerable manual effort and attention by an operator.

In the machine according to the present invention the baffle discs are picked up from a supply tube, by vacuum in a ram element, which oscillates through an arc to deliver the disc to a battery cap and press the disc within the cap. By mechanism associated with the oscillating ram, a vent hole is drilled in the cap at the time of insertion of the disc. Limit switches are arranged in a manner to maintain discs in the supply tube between a maximum and minimum quantity, and a novel overload release is provided in the ram drive.

It is, therefore, an object of the invention to provide a machine which will automatically and continuously assemble discs into their holding caps, a further object being to accomplish the foregoing while concurrently drilling a hole in the cap. Another object is to eliminate hand feeding of discs into the feed tube from which they are picked up for assembly. More particularly, it is an object to eliminate hand feeding of discs into the supply tube by automatic switches which govern periodic movement of the discs into the feed tube from a hopper, whereby the supply of discs in the feed tube fluctuates between a maximum and a minimum value. A still further object is to provide a safety device to prevent breakage or stalling on overload in the inserting operation.

These and other ends, which will be apparent to those skilled in the art, are accomplished by the present invention, a preferred, working embodiment of which is described in the following specification and illustrated in the drawings, in which:

Fig. 1 is a front elevational view of the machine,

Figure 1A:
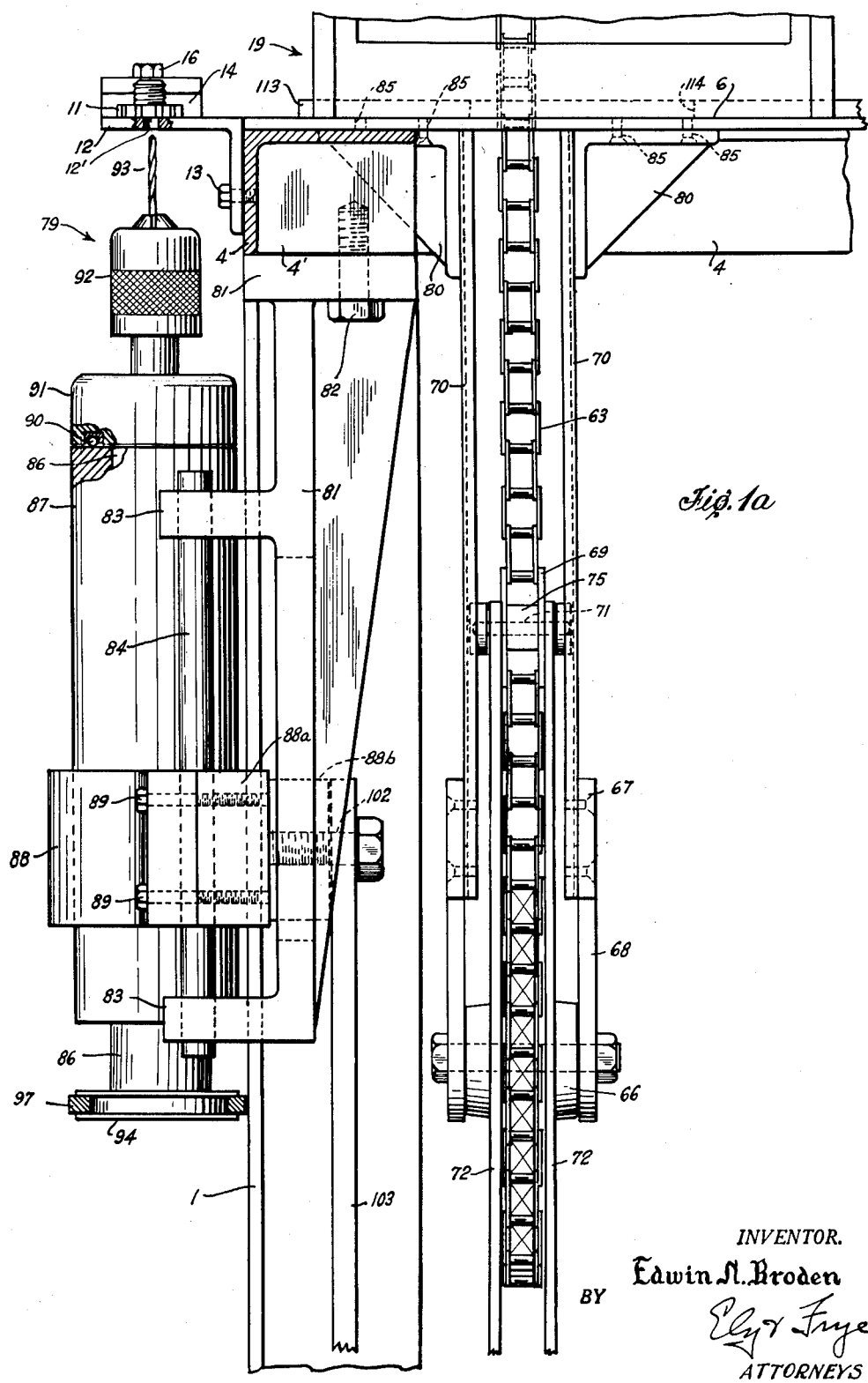
Fig. 1a is a sectional view, enlarged, taken on the line 1a—1a of Fig. 1.

Fig. 2 is a side elevational view of Fig. 1, as seen from the left of that figure, Fig. 3 is a top plan view of Fig. 2, Fig. 4 is a sectional view, taken on the line 4—4 of Fig. 2, Fig. 5 is an enlarged view of a detail from Fig. 4, showing the guide channels confining the rollers on the ram-oscillating chain, Fig. 6 is a view taken along the line 6—6 of Fig. 5, with the guide channels partly broken away, Fig. 7 is an enlarged view of the oscillating ram, as seen along the line 7—7 of Fig. 1, and partly broken away, Fig. 8 is a side view of the ram of Fig. 7, as seen from the right of that Figure, and also broken away in part, Fig. 9 is a sectional view, taken on the line 9—9 of Fig. 7, Fig. 10 is an enlarged view of a detail in Fig. 2, showing the limit switch arrangement for the feeding tube, Fig. 11 is an elevational view of a detail, as seen on the line 11—11 of Fig. 2, showing the overload release mechanism for the ram, Fig. 12 is a side view of Fig. 11, as seen from the right of that figure, Fig. 13 is an exploded view in perspective, showing a battery cap, and the baffle disc to be inserted therein, and Fig. 14 is a bottom plan view of the battery cap, showing the central, vent perforation.

Referring to the drawings by characters of reference, there is shown a framework comprising upright, corner angle bars 1, with lower, transverse angle bars 2 supporting a platform 3, and upper cross bars 4 supporting a table top 6. An inclined chute 7, supported on straps 8 and 9, secured to bars 4, conducts battery caps 11 to a shelf 12 of an angle bar bracket, bolted to bars 4 at 13. A stop 14, secured to shelf 12 by a bolt 16, serves to position the battery caps for a drilling operation and the insertion of a baffle disc, as will be explained.

A tube 17 serves to hold a supply of stacked baffle discs 18, which are to be picked up and inserted into the battery caps 11. A baffle disc and battery cap are shown in the exploded view in Fig. 13. The mechanism for transferring the baffles is supported on a U-form upright 19, which is secured, as by welding, to table top 6. Journaled in upright 19 are three shafts 22, 23, 24, to the outer ends of which are secured, as by keys 15, respective crank arms 26, 27, 28. Upper crank arm 26 has its outer end journaled on a pin 29, carried by a sleeve 31, secured on a tube 32, which constitutes the housing for the plunger mechanism which forces discs 18 into caps 11. Similarly, lower crank arm 28 is journaled on a pin 33 on a sleeve 34 on tube 32. The crank arms 26, 28 are suitably held on their respective pivots by nuts 38. By this construction, it will be seen that tube 32 is swingable in an arc on the crank arms, while remaining vertical.

Tube 32 serves as a guide for an inner, sliding, plunger tube 36 having a pin 37 on which the middle crank arm 27 is journaled. As best seen in Fig. 7, pin 37 comprises a reduced neck on a body member 20 having a bore 21 by which it is received on plunger or ram 36. The pin has an axial bore extending through the body 20 to bore 21, in which are threaded a set screw 25 which locks the body in place on rim 36, and a flanged cap screw 30 which secures crank 27 on the pin. Tube 32 has an elliptical opening 39 to permit relative movement of the inner tube with respect to the outer tube. Middle crank 27 also has an elliptical opening 41 to avoid jamming when the inner tube 36 moves in strictly axial motion relative to outer tube 32, when the latter is stationary.

Inner tube 36 has a tube insert 42 threaded in its lower end, with a terminal cup portion 43 bearing a short length of rubber tube 44, backed by an inner metal tube 35, friction-fitted into tube 42. Tube 42 is secured by a washer 50 and lock nut 55, and washer 50 is engageable with the bottom of outer sleeve 32, being normally held against this stop by a spring 49 engaging a collar 51 on the top end of tube 36, the collar being secured by a set screw 52. A bearing sleeve 40 in tube 32 accommodates tube 36 for its sliding motion. A bearing sleeve 45 at the top of tube 32 has splines 46 mating with splines 47 of the sliding tube 36 so that, during sliding of the inner tube, pin 37 remains centrally located in opening 39 and there is no eccentric loading on the pins of the three crank arms. A pair of stops 53, 54 on the front face of U member 19 are arranged to be contacted by upper crank arm 26 in position thereof about 180° apart.

A flexible hose 56, leading from a vacuum pump 57 on platform 3, connects with a nipple 58 threaded in the top of plunger tube 36 and provides a suction for picking up a baffle disc each time rubber tube 44 is inserted into tube 17.

A cap 59, secured to and surrounding the lower end of outer tube 32, has an inwardly tapering bottom 60 suited to the cup-shaped opening in battery caps 11, to provide proper centering for plunger end 44. This cap is slotted at 61 to provide a ready path of air to the suction tube, so that drilling dust will not be drawn in when the system is positioned over the drill.

It will be seen that after crank arm 26 is arrested by stop 53, the plunger moves into the baffle-holding tube 17 to pick up a baffle disc by suction. Thereafter, the crank arms move through 180° until top crank arm 26 is arrested by stop 54, and the plunger moves downward, relative to tube 32, against the pressure of spring 49, to press the baffle disc into the battery cap.

The crank arm system is powered through the middle crank shaft 23. Since the oscillation of middle crank 27 covers slightly more than 180°, it is advisable to drive it from a system including a strictly linear motion, as by means of a chain. Therefore, middle shaft 23 has keyed thereto a sprocket 62 driven by a chain 63. The latter passes through suitable openings 64 in the base of mounting 19 and in the table top, and is trained around a lower idler sprocket 66. Chain 63 has inserted, between two of its links, a spool-like element 69 having a spindle 71 on which are pivoted the upper ends of a pair of connecting rods 72. The latter, at their lower ends, are pivoted to a crank arm 73, keyed to the output shaft 74 of a speed reducer 76. The input to the latter is through a belt 77 leading from a motor 78 bolted to cross plates 75, which are secured to a pair of corner uprights 1 of the framework. Spindle 71 is constrained to linear motion by means of a pair of opposed channels 70 depending from the underside of table 6, the channels having welded corner braces 80 secured to the table by screws 85. The grooves of channels 70 form guide tracks for a pair of rollers 75 mounted on the ends of the spindles 71. A pair of L-shaped straps 67, secured to the lower ends of channels 70, serve as journal supports for idler sprocket 66. It will be seen that as shaft 74 rotates, the crank arm 73 continuously revolves, imparting oscillating linear motion to chain 63, through conecting rods 72, and a corresponding oscillating rotary motion is imparted to sprocket 62 to carry crank arms 26, 27, 28 through the desired sector of oscillation.

Shaft 74 also moves a drill 79, which is reciprocable, vertically, to and from the battery caps 11 in their position against stop 14. The mounting for the drill comprises a bracket 81 secured to a block 4' on the rear of front cross piece 4 by bolts 82. Bracket 81 has a pair of outwardly extending lugs 83, bored to slidingly receive rods 84 carried by the drill. The drill comprises a shaft 86 rotatable in a sleeve 87 secured to a split plate 88, which is clamped by screws 89 to slide rods 84. Shaft 86 has an enlarged head 91 with shoulders having suitable anti-friction bearings 90, overlying sleeve 87 and in which is suitably secured a conventional chuck 92 for holding a drilling tool 93, which is adapted to pass through an opening 12' in the shelf 12. A pulley 94, keyed on shaft 86, is driven by motor 78 through a belt 97.

Drill 79 is raised and lowered with respect to bracket 81 by means of a double arm lever having a sleeve 98 rotatable on a shaft 99 secured by nuts 100 between a pair of corner uprights 1, said double lever having a forwardly located arm 101 (Fig. 4) articulated by a pin 102 to a link 103, the upper end of which is pivoted by a bolt 104 threaded in a lug 88b on the rear section 88a of a split plate 88, and also a rearwardly located arm 106 having pivoted, at its distal end, a follower roller 107 dwelling on a cam 108 having a hub 105 which is keyed to output shaft 74 of the speed reducer. Cam 108 has a gradually rising portion 109, which lifts the double lever, and hence the drill, during each rotation of shaft 74, one battery cap being processed in each such rotation. Following the rise 109 of the cam, there is a steep drop 111 which permits speedly withdrawal of the drill from the work. Follower 107 is constantly urged downwardly on the cam, by a spring 112 anchored to arm 101 of the lever and to one of the lower cross plates 2 of the framework.

An ejector arm 113 for the finished battery caps is slidable across the table, passing through an opening in the bottom of U-member 19, and has an opening 114 to clear the chain 63. Ejector arm 113 has an upturned, rear end 117, secured by nuts 118 to the piston rod of an air cylinder 119. The latter is actuated through a conduit 121 leading from a valve 122, and this valve has a follower roller 126 actuable by rise 109 of cam 108, subsequent to withdrawal of the drill. The follower 126 of the valve, which is conventional, is constantly urged against the cam 108 by spring action.

The baffle-holding tube 17 receives the baffles from a chute 127 leading from a suitable automatic dispensing device which will deliver a train of these discs without overlapping. This device, shown in general outline and indicated by the numeral 128, may be of any suitable type, but it is preferred to use a so-called "vibrator," which separates the discs by centrifugal action. This is of conventional structure and, therefore, need not be shown in detail.

The tube 17 is secured by a set screw 129, in a bore in a plate 131, secured by bolts 132 to a bracket 133, which in turn is secured by bolts 134 to the upper left corner of the framework of the machine. A plate 136 has an opening receiving the bottom of tube 17, and secured to and depending from plate 136 is a U member having arms 137 and a bottom span 138, one of arms 137 having a bracket 139 secured to an upright bar 1 by bolts 141.

Received in tube 17 for sliding motion is a rod 142 having a lower head 143. Rod 142 is provided with circular ratchet teeth 144, cooperating with a pawl 146 pivoted on plate 136 and arranged to oppose upward movement of ratchet rod 142. Rod 142 has an axial bore receiving a guide rod 147 having its bottom end threaded in lower span 138 of the fork, and locked in place by a nut 145. A coil spring 148 surrounding guide rod 147 and dwelling on bottom 138 of the U member, contacts the head 143 of the ratchet rod 142 to urge the same upwardly. The baffle discs stacked in tube 17 are supported on the top of ratchet rod 142 and move therewith as the supply of discs fluctuates between a maximum and minimum, as will be explained.

A pin 149, on which pawl 146 is keyed, is journaled in plate 136 and carries a crank arm 151 on its outer end. Crank 151 is turned, to release the pawl, by a push rod 152, slidable through openings in bracket 133 and plate 131. Push rod 152 is normally urged upwardly by a spring 153 acting between plate 131 and a collar 154 on the rod, so that pawl 146 is normally urged into engagement with the ratchet teeth to oppose upward movement of rod 142. Push rod 152 carries, at its upper end, a rearwardly extending arm 155, having a transversely extending pin 156, which is contacted once during each working cycle by middle crank arm 27, so that the push rod is moved against its retaining spring and fully releases the pawl. At this stage, the suction plunger tube 36 is in position to receive a baffle disc and spring 148 is urging the entire stack of discs against the said plunger tube. As the plunger tube rises, the pawl 146 is released to again seize rod 142 to keep the stack of discs from being ejected. However, after removal of a certain number of discs, the combined thickness of which just exceeds the ratchet teeth spacing, the pawl, on its return, will engage the next lower tooth, with the result that the feed rod 142 moves upwardly a distance equal to one notch of the ratchet. This movement of the feed rod is utilized at a predetermined vertical position thereof, to actuate the feeder device to replenish the stack of discs in tube 17 up to the predetermined maximum, after it has been reduced to a predetermined minimum. In this way, the ultimate feed of discs to the pick-up suction tube is not dependent on the maintenance of one-by-one delivery from a hopper chute, delivery from the chute being subsidiary and occurring at relatively long intervals, and the actual pickup being from a neatly arranged stack.

Replenishment of the stack of discs in tube 17 is effected by resuming action of vibrator 128 through a limit switch 157, the main body of which is of conventional form, having a contact plunger 158, actuated by a lever 159, pivoted on a pin 160 carried by a plate 161 which is secured to one of the arms 137 of the U member and which also supports switch 157. The upper end of the lever is forked and carries a pin 164 on which is mounted a roller 166. A spring 167 attached to lower end 168 of lever 159 normally urges the lever outwardly from plunger 158 with roller 166 abutting the ratchet rod 142. The lower end of lever portion 168 is constantly contacted by a lever 169 pivoted on a pin 171, carried by a plate 172 attached to the limit switch, and is urged toward the said lower end of portion 168 by a spring 173 anchored in pin 171. Lever 169 has a stepped portion providing a shoulder 174, behind which the lower portion 168 of the main lever engages to hold plunger 158 in its inner position. Lever 159 is actuated to move plunger 158 inwardly when roller 166 is engaged by a curved portion 175 of head 143 of the ratchet rod. This happens when the ratchet rod is in its maximum permissible upper level of travel, or when the supply of discs in tube 17 requires replenishing. Inward movement of plunger 158 starts the vibrator 128 so that movement of baffle discs down chute 127 is resumed, and the energization of the vibrator is maintained by locking of lower part 168 of lever 159 behind shoulder 174. Thus, several discs will drop into tube 17 between successive pick-ups by the plunger tube 36. The plunger continues oscillation during this addition and, since the plunger end descends to the same level at each pick-up, the rod 142 will be moved downwardly by the plunger an amount equal to the combined thickness of the discs added in each cycle, and return is prevented by the pawl. After several cycles, depending upon the rate of delivery of discs down chute 127, the head 143 of the ratchet rod contacts locking lever 169 to release main lever 159, and the delivery vibrator is shut off. During operation of the vibrator, there is a probability that plunger 36 will contact a disc, which is only part way over the opening of tube 17. Therefore, an interrupter is provided which comprises a leaf spring 176 fastened to a bridge 177 secured to baffle chute 127. The end of leaf 176 is normally above the path of travel of baffles down the chute, but has an arm 178 which is contacted by a plunger 179 carried by oscillating tube 32. The plunger is slidable in a saddle 180 carried by a collar 160 on tube 32, and is normally held downwardly by a surrounding spring 162 pressing against a collar 163 on the plunger. It will be seen that on each travel of tube 32 to the baffle pick-up position, the leaf 176 is pressed downwardly by plunger 179 so that in the event that delivery of baffles down chute 127 is proceeding, such delivery will be interrupted just prior to descent of the pick-up tube 36 into tube 17.

The baffle discs are made of hard rubber and it is necessary to keep them warm during the process of inserting them in the battery caps. To this end, suitable warming means is provided in the hopper 128 and an electric heating element 181 is provided in surrounding relation to tube 17 in the region accommodating the discs.

*Operation*

Assuming a phase of operation at which assembly of a baffle in one battery cap has just been completed, crank arm 73 urges the link 69 of chain 63 upwardly, so that sprocket 62 turns counter-clockwise and crank 27 also swings counter-clockwise, first raising plunger tube 36 and then outer tube 32 through spring 49. At the commencement of rise of the plunger tube, follower 107 drops behind shoulder 111 of cam 108 and the lever system 106, 98, 101, 103 is actuated by gravity, assisted by spring 112, to quickly lower the drill. As the cam revolves further, roller 126 of valve 122 is moved to actuate the valve so that air cylinder 119 moves arm 113 to eject the completed battery cap, which falls into a suitable receiver. As follower 126 moves in behind shoulder 111, air cylinder 119 is de-energized and ejector slide 113 recedes by suitable spring action.

Crank arms 26–28 swing over into a position with tube 36 above tube 17, crank arm 26 is arrested by stop 53, and crank 27 carries plunger tube 36 downwardly, in a straight line, into contact with the top of baffle disc of the stack on tube 17. If vibrator 128 happens to be feeding, this feed is interrupted by the downward movement of leaf spring 176, just prior to entry of plunger tube 36 into tube 17. The ratchet rod 142 is moved downwardly by plunger 36 by an amount equal to the combined thickness of the discs lying above the lowermost position of the plunger. The top disc is picked up by the suction in tube 36 and, after the crank 73 passes upper center, link 69 of chain 63 moves downwardly so that crank 27 begins the upward movement of tube 36. As tube 32 is picked up in this movement, pawl 146 is released and moves in to hold the rod 142 in position so that the stack of discs are not thrown out of tube 17 by spring 148.

During the cycles when discs are not being fed into tube 17 from chute 127, the rod 142 moves downwardly under the urging of plunger 36 by an amount which diminishes with the removal of each disc until a sufficient number have been removed that the next succeeding ratchet tooth slips past the returning pawl to define a stage of upward advance of rod 142, toward actuation of limit switch 157 and resumption of feed of discs to tube 17 from hopper 128.

Crank 27 swings until the cap 60 of tube 32 seats in the opening of the battery cap positioned against stop 14. Thereafter, plunger tube 36 continues downwardly, forcing the baffle into the battery cap. Simultaneously with the full engagement of cap 60 in the battery cap opening, the rise 109 of cam 108 effects gradual lifting of drill 79 by action of the associated leverage, and a hole is bored in the center of the dome of the battery cap. This completes the cycle.

If for any reason the tube system carried by crank 27 should meet with resistance at either end of its travel, as where an object is interposed in its path, or an unduly high battery cap is in position, breakage will occur or the motor will be stopped. Therefore, it is desirable to provide a feature wherein the system will yield in proper degree. To this end, the construction shown enlarged in Figs. 11 and 12 is employed to provide a relief feature between the drive sprocket and its shaft 23. The top sprocket 62 is mounted for rotation on a sleeve 183, which is secured to shaft 23 by a key 184. The sprocket has a hub 186, near the outer periphery of the face of which is welded a plate 187, the inner face of the plate having a pair of blind bores 188, 189. Sleeve 183 has a flange 191 having an arcuate periphery extending somewhat beyond 180° of arc and a straight edge 192 joining the ends of the arcuate portion. Secured to this flange by bolts 193, at the edge opposite the straight portion 192, is an angle bracket providing a shelf 194. The latter has bores 196, 197 near its respective ends, loosely accommodating bolts 198, 199. Heads 201, 202 of the latter are received in bores 188, 189 and retained therein by springs 203, 204 engaging behind the said heads and against shelf 194. Nuts 206, 207 on the bolts limit the extent of movement of the bolts under the urging of the springs, and also serve to regulate the compression in the springs. Preferably, the adjustment is such that the heads of the bolts just clear the bottom of bores 188, 189.

Assuming sprocket 62 to be rotating clockwise, it will tend to rotate on sleeve 183, with the latter lagging due to the load on the system connected to output shaft 23, whether it be merely friction and the weight of the parts, or the work performed, as in the insertion of the baffle.

As sleeve 183 lags, the bottom of bore 189 contacts the head 202 of bolt 199, compressing spring 204, while moving the bolt through bore 197, until the total energy stored in spring 204 exceeds the work load resistance existing at shaft 23, whereupon the drive of sprocket 62 is transmitted to shelf 194 through spring 204, and sleeve 183 and shaft 23 are rotated. If any unusual resistance is met by the parts carried by shaft 23, the spring 204 will compress further to take up the excess load, and sprocket 62 will rotate relatively to sleeve 183. During any compression of the spring beyond the equilibrium condition, rod 199 will be tilted somewhat and, for this reason, bore 197 and bore 189 are sized to provide a large degree of clearance for the bolt. The cut-away portion of flange 191 provides clearance for plate 187 during the rotation of the sprocket relatively to the sleeve. However, since any abnormal resistance is to be expected only at the ends of the swing cycle of shaft 23, and since oscillation is involved, rather than rotation in a continuous direction, the necessary clearance does not exceed a determinable maximum. In these respects, the arrangement differs from a conventional slip clutch.

During the action just described, bolt 198 and spring 203 take no part, except that the bolt may be slightly tilted as bore 188 moves away from it. For rotation of the sprocket in the opposite direction, a similar action takes place, with spring 203 being compressed and with spring 204 remaining inactive.

While a certain preferred embodiment has been shown and described, the invention is not limited thereby since changes in the size, shape and arrangement, for instance, of the various parts, may be resorted to without departing from the spirit or scope of the appended claims.

What is claimed is:

1. A machine for assembling elements into receptacles, comprising a housing for receiving said elements in stacked relation, a station for receiving said receptacles, a ram, and means mounting said ram for swinging motion between said housing and said station, said housing comprising feed means to urge the stack of elements toward the ram, detent means restraining motion of said stack, and means actuated by the ram for temporarily removing said detent means when the ram is above said housing.

2. In a device as in claim 1, a supply hopper having power means for delivering a train of said elements to said housing, and switch means for said power means actuated by said feed means to energize said power means when the supply of elements in said housing is at a predetermined minimum, and deenergize said power means when the supply of elements in said housing is at a predetermined maximum.

3. In a device as in claim 2, means responsive to movement of said ram toward said housing to interrupt movement of said elements from said housing.

4. In a machine having pick-up means for articles to be processed, a dispenser for said articles comprising a tube, a plunger movable axially through said tube, means constantly urging said plunger axially of said tube, pawl and ratchet means normally restraining said plunger from motion axially of the tube, and means responsive to approach of said pick-up means to said tube to temporarily disengage the pawl and ratchet means.

5. For use in oscillatory rotary motion in a machine having a dispensing unit for pick-up of articles to be assembled and an indexing station for assembly, a plunger having a passage for communication of suction to one end of the plunger, a crank arm having a sliding pivotal connection with said plunger, a sleeve surrounding said plunger and slidable axially thereof, a pair of crank arms pivoted on said sleeve and having effective lengths equal to that of the crank arm on said plunger, stop means arranged to limit relative motion between said plunger and sleeve in one direction, and a spring arranged to resist relative motion between said plunger and sleeve in the other direction, said sleeve having an opening permitting connection between said plunger and its crank arm, and said opening being of a size to permit the relative axial movement between said plunger and said sleeve.

6. A machine for assembling elements into receptacles comprising a ram mounted for oscillatory, rotary motion while remaining at a fixed inclination, an endless chain for swinging said ram, a crank arm and connecting rod for driving a part of said chain in rectilinear movement, a drilling tool mounted for sliding motion to and from the location of one terminus of oscillation of said ram, a cam rotatable with said crank arm, and lever means pivoted to said drilling tool and having a follower actuated by said cam, whereby the drilling tool and the ram approach and recede cyclically.

7. In a device as in claim 6, a feed tube for elements to be assembled, located at the other terminus of oscillation of said ram, a feeding plunger in said feed tube, pawl and ratchet means normally restraining said plunger, and means responsive to approach of said ram to said feed tube to temporarily disconnect the pawl and ratchet means.

8. In a machine for drilling vent holes in battery caps, and assembling baffle discs thereinto, means to hold a supply of said discs, means to position one of said caps, means movable in an arcuate path to pick up one of said discs and carry it through an arcuate path to said cap, a drill, and means to move said drill into contact with said cap in timed relation with the delivery of said disc to said cap.

9. In a machine as in claim 8, means responsive to pick up of a predetermined number of said discs, to move said supply toward the point of pick-up.

10. In a machine as in claim 9, feed means for replenishing said supply, and means responsive to a minimum supply to actuate said feed means and responsive to a maximum supply to stop said feed means.

11. In a machine for drilling vent holes in battery caps and assembling baffle discs therein, means to hold a supply of said discs with a disc exposed, a pick-up arm reciprocable from a position in alignment with the cap to a position in alignment with the disc supply to pick up a disc from the supply and deliver it to a cap, means for drilling a hole in each cap after the disc contacts the cap, means in timed relation to the delivery of the disc thereto, to move the drill toward the cap and means to replenish the supply of discs without interfering with the movement of said pick-up arm.

12. A machine for assembling an element into a receptacle, comprising a pickup station for said elements, a receiving station for said receptacles, a ram, means mounting said ram for swinging motion in a vertical plane between said stations, means on said ram for attaching said ram to an element in said housing and for depositing said element in said receptacle, a sleeve surrounding said ram and movable axially with respect thereto, means for axially oscillating said ram and said sleeve, means for moving said ram axially relatively to said sleeve, spring means normally preventing the axial motion of the ram, and stop means for said sleeve whereby said sleeve is restrained and the ram moves axially relative to said sleeve against the pressure of said spring at each of said stations.

13. A device as in claim 12, said ram being pivoted on a driven crank arm and said sleeve being pivoted on a pair of crank arms revolvable about axis lying in a common plane with the axis of revolution of the crank arm of said ram.

14. In a device as in claim 13, drive means for the crank arm pivoted on said ram comprising a sprocket and chain, and means to move said chain in alternate directions.

15. A device as in claim 14, said drive means comprising a driven shaft, a connecting rod pivoted on said chain and pivoted concentrically to said shaft, and guide means constraining the chained pivoted end of said rod to rectilinear motion.

References Cited in the file of this patent

UNITED STATES PATENTS

| | | |
|---|---|---|
| 297,495 | Campbell | Apr. 22, 1884 |
| 946,584 | Smith | Jan. 18, 1910 |
| 1,321,512 | Eaton | Nov. 11, 1919 |
| 1,352,251 | Dickinson et al. | Sept. 7, 1920 |
| 1,629,513 | Lange | May 24, 1927 |
| 1,661,417 | Evans | Mar. 6, 1928 |
| 1,690,541 | Kuzelewski | Nov. 6, 1928 |
| 1,742,414 | Rogers | Jan. 7, 1930 |
| 1,749,620 | Winslow | Mar. 4, 1930 |
| 2,057,244 | Mayner | Oct. 13, 1936 |
| 2,108,163 | Clark | Feb. 15, 1938 |
| 2,359,384 | Poole | Oct. 3, 1944 |
| 2,370,828 | Widmont | Mar. 6, 1945 |
| 2,380,306 | Hallowell | July 10, 1945 |
| 2,431,279 | Remington et al. | Nov. 18, 1947 |